(12) United States Patent
Pfannkuchen

(10) Patent No.: US 7,773,728 B2
(45) Date of Patent: Aug. 10, 2010

(54) CIRCUIT AND METHOD FOR PROVIDING ACCESS TO A TEST AND/OR MONITORING SYSTEM

(75) Inventor: Ralf Pfannkuchen, Wuppertal (DE)

(73) Assignee: 3M Innovative Properties Company, St. Paul, MN (US)

( * ) Notice: Subject to any disclaimer, the term of this patent is extended or adjusted under 35 U.S.C. 154(b) by 119 days.

(21) Appl. No.: 10/598,927

(22) PCT Filed: Feb. 3, 2005

(86) PCT No.: PCT/US2005/003283

§ 371 (c)(1),
(2), (4) Date: Jul. 9, 2007

(87) PCT Pub. No.: WO2005/094089

PCT Pub. Date: Oct. 6, 2005

(65) Prior Publication Data

US 2007/0283068 A1    Dec. 6, 2007

(30) Foreign Application Priority Data

Mar. 18, 2004    (EP) .................................. 04006533

(51) Int. Cl.
H04M 1/24    (2006.01)
H04M 3/08    (2006.01)
H04M 3/22    (2006.01)

(52) U.S. Cl. .................... 379/27.06; 379/22; 379/29.01

(58) Field of Classification Search ................ 379/1.01, 379/22, 23, 24, 27.06, 27.07, 29.01, 29.03, 379/29.04, 30, 32.01, 14.01, 15.01, 19, 326–328
See application file for complete search history.

(56) References Cited

U.S. PATENT DOCUMENTS

| 2,885,603 | A | 5/1959 | Rose |
| 5,595,507 | A | 1/1997 | Braun et al. |
| 5,800,187 | A | 9/1998 | Vermon et al. |
| 5,832,058 | A * | 11/1998 | Walance et al. ............... 379/22 |
| 6,265,842 | B1 | 7/2001 | Hard et al. |
| 6,453,015 | B1 * | 9/2002 | Benedict et al. .......... 379/27.01 |
| 6,584,148 | B1 * | 6/2003 | Zitting et al. ............... 375/222 |
| 6,654,255 | B2 | 11/2003 | Kruse et al. |
| 7,324,632 | B2 | 1/2008 | Badura et al. |

FOREIGN PATENT DOCUMENTS

| WO | WO 01/45452 A2 | 6/2001 |
| WO | WO 03/065699 A1 | 8/2003 |
| WO | WO 03/079599 A2 | 9/2003 |

OTHER PUBLICATIONS

Parker, William H., "Electromagnetic Interference: A Tutorial"; *IEEE Aerospace Applications Conference, 1996 Proceedings* (Feb. 3, 1996); vol. 3; pp. 177-186.

Su, Chauchin, et al., "Metrology for Analog Module Testing Using Analog Testability Bus"; *IEEE/ACM International Conference on Computer-Aided Design, 1996, Digest of Technical Papers* (Nov. 10-14, 1996); pp. 594-599.

* cited by examiner

*Primary Examiner*—Quoc D Tran
(74) *Attorney, Agent, or Firm*—Gregg H. Rosenblatt

(57) ABSTRACT

A circuit (10) and method for providing test and/or monitoring access to at least two telecommunication lines (18). This circuit (10) comprises at least one bus (12) and at least two primary branches (14) extending there from, at least one of the primary branches (14) being provided with at least one switch (26), which in a first state connects the primary branch (14) with the bus (12) and in a second state connects the primary branch (14) with ground. The method comprises the step of connecting only that primary branch (14), through which access to a telecommunication line 18 is to be established, with the bus (12).

13 Claims, 3 Drawing Sheets

CIRCUIT AND METHOD FOR PROVIDING ACCESS TO A TEST AND/OR MONITORING SYSTEM

CROSS REFERENCE TO RELATED APPLICATIONS

This application is a national stage filing under 35 U.S.C. 371 of PCT/US2005/003283, filed Feb. 3, 2005, which claims priority to 04006533.6, filed Mar. 18, 2004, the disclosures of which are incorporated by reference in their entirety herein.

TECHNICAL FIELD

The invention relates to a circuit and a method for providing test and/or monitoring access to at least two telecommunication lines.

BACKGROUND

In the field of telecommunications numerous customers are connected with the switch or other equipment like line terminating equipment or multiplex systems (e.g. a Digital Subscriber Line Access Multiplex, DSLAM) of a telecommunications company via telecommunication lines. Between the customer and the switch or other equipment sections of the telecommunication lines are connected with connection points, such as terminal modules. The terminal modules establish an electrical connection between a wire, which is connected to the terminal module at a first side, and another wire, which is connected to the terminal module at a second side. There is sometimes a need to carry out measurements for the connection thus established. Measurements can be made, for example, between the telephone connection of a customer and the switch of the telecommunications company. Such measurements serve, to test the connection in general, or to localize any disturbances which may have occurred.

In this context, WO 03/079599 assigned to the applicant, discloses a so-called contact bank as well as circuits for providing test and/or monitoring access to telecommunication lines. In particular, the circuit can comprise a bus and several stub wires. The stub wires lead to the telecommunication lines that are to be tested. Any stub wires which are not in use can be disconnected from the bus. However, also in this disconnected state the stub wires act as antennas and may deteriorate the result of the measurements. In particular, the problem underlying the invention described below cannot be solved by the known circuit.

SUMMARY OF THE INVENTION

The invention provides a circuit for providing test and/or monitoring access to at least two telecommunication lines, which is improved with regard to the accuracy of measurements and/or the opportunities offered by the circuit with regard to the types of telecommunication lines, which can be tested or measured by such a circuit. In particular, also telecommunication lines, which transmit signals at high frequencies, can be accurately measured.

The circuit, providing test and/or monitoring access to at least two telecommunication lines comprises, firstly, at least one bus and, secondly, at least two primary branches extending from the bus. As regards the general structure of the circuit and the test and/or monitoring equipment described herein, reference is made to the above-mentioned WO 03/079599, the contents of which are incorporated herein by reference.

WO 03/079599 particularly describes a system comprising a contact bank including circuits as described above, as well as a measuring system, such as a measuring head. In this context, one or more digital signal processors and A-D (analog-digital) converters can be used for the measuring system. The measuring system can be configured to measure physical parameters, such as voltage or frequency-dependent voltage. Furthermore, interfering voltages can be measured. The measuring head can also be configured so as to emit specific signals and subsequently measure the response for obtaining specific information regarding the condition or the properties of the line therefrom. Further details of a measuring system are described in the mentioned document and these aspects are incorporated herein by reference as the present invention can be applied to such systems so as to provide an improved measuring system.

In particular, it is apparent from this document that the circuit described herein can comprise a bus, which "runs along" several telecommunication lines and/or terminal modules, at which telecommunication lines are connected. The bus can also be called a superior line. Furthermore, at least two primary branches extend from the bus and thus each provides access to a telecommunication line or a telecommunications module. In the case of a primary branch, which is associated with a terminal module, the primary branch can, as described in more detail below, have further, secondary branches, which provide access to the individual telecommunication lines or contacts provided in a particular telecommunications module. Both the primary and secondary branches as described herein could also be called tributary branches or stub wires, as mentioned in WO 03/079599.

In the circuit at least one of the primary branches is provided with at least one switch, which, in a first state, connects the primary branch with the bus and, in a second state, connects the primary branch with ground. The switch does not necessarily have to "belong to" the primary branch. Rather, it is sufficient when the switch is provided at the connection between the primary branch and the bus in any suitable manner to provide the above-mentioned, at least two states. In this context, ground could also be called signal ground and essentially has the following effects. Each primary branch that remains connected with the bus while it is not in use, i.e. while the telecommunication line connected therewith is not accessed, adds to the capacitive load on the bus. This creates a parasitic capacitance. This effect is particularly relevant for primary branches which have secondary branches and switches connecting the secondary branches with the primary branch. These contribute to the parasitic capacitance and deteriorate the transmission quality of the line. In other words, the signal, which is obtained from the test and monitoring line involving the bus and the primary branches, is improved by the novel circuit described herein. In particular, noise from any primary branches which are momentarily not in use is prevented, to a highly relevant extent, from being transferred to the bus. Thus, precise measurements, in order to test and/or monitor a particular telecommunication line, can be conducted by the bus and that primary branch of the circuit, which is momentarily in use.

This improvement allows precise measurements to be made at higher frequencies. Thus, the opportunities offered by the circuit are improved with respect to the signal bandwidth. In particular, telecommunication lines which also transmit data at higher frequencies instead of, or in addition to, voice, can be tested and/or monitored in an improved manner. Furthermore, the novel circuit allows the number of telecommunication lines, which can be connected and the same bus constituting a test access line, to be increased. Also in this respect, the novel circuit offers improved opportunities, as it allows accurate measurements also of those telecommunication lines which transmit signals at particularly high frequencies.

This is to a certain extent realized in the present invention by the fact that all those primary branches which are momentarily not in use, are connected with ground. By disconnecting those primary branches, their capacitances can be taken away from the bus. However, the disconnected primary branches can still act like antennae and can thus transmit signals to adjacent primary branches. Since one adjacent primary branch would be momentarily in use, the described effect has the potential to deteriorate the measurement, which is made via the momentarily used primary branch. However, connecting primary branches, which are momentarily not in use, with signal ground, will drain any current which might have been induced, and thus, substantially prevents the transmission of noise to adjacent primary branches. In summary, the circuit described herein has at least one additional multiplex level allowing a particular primary branch to be connected with the bus and the remaining primary branches to be disconnected from the bus in order to achieve the above-described effects. While these effects can be obtained by enabling a single primary branch to be connected with ground when it is not in use, the described effects are particularly strong when all those primary branches that are momentarily not in use, are disconnected from the bus and grounded. In particular, the disconnected state can constitute an initial or "normal state", wherein only that primary branch, through which test and/or monitoring measurements are to be conducted, is connected with the bus. All remaining primary branches can remain connected with ground. The connection of "unused" primary branches with ground does not necessarily have to be continuous. In other words, the unused primary branches can be connected with ground only at certain times, for example, only when measurements are made via certain primary branches. The "unused" primary branches, which may have been disconnected from the bus before, can, at the time of measurement, be connected with ground in order to improve the accuracy of the measurements as described above.

At least one of the primary branches can comprise at least two secondary branches. For example, a particular primary branch could be associated with a terminal module, and the secondary branches could be associated with particular contacts of a terminal module or telecommunication lines connected therewith. Thus, the secondary branches provide access to particular telecommunication lines. As will be apparent to those skilled in the relevant field, the structure can be "branched" further. E.g. each secondary branch could provide access to a particular terminal module, and further branches extending from the secondary branches then provide access to individual telecommunication lines. In order to further enhance the above-described effects, at least one of the secondary or further branches can comprise a switch, which, in a first state, connects the secondary branch with the (primary) branch. In an initial or normal state the secondary branch can be disconnected from the primary branch so that the above-described effects are obtained. In this case, the switch of the secondary branch can be configured to connect the secondary branch with ground, when the secondary branch is momentarily not in use, i.e. disconnected from the (primary) branch and other secondary branches. In this manner, further improvements regarding the quality of measurements made through one or more of the remaining, connected primary branches, can be achieved. For example, a switch, which can be provided in a secondary branch, can be configured to connect the secondary branch with ground. However, if this is not possible, e.g., if the telecommunication line is a line of the exchange-side, an additional switch could be provided disconnecting the telecommunication line and allowing a certain section of the secondary branch to be connected with ground.

In certain applications at least two buses can be provided, and at least one primary branch can comprise at least two sub-branches, each of the sub-branches being connected with one of the buses. At least one further switch can be provided which allows a telecommunication line to be tested with either one of the buses. Such a switch has the particular advantage of allowing tests and measurements to be made via a selected one of the buses and sub-branches. However, such a switch particularly contributes to the parasitic capacitance and coupling between the sub-branches. Therefore, the possibility of connecting an unused primary branch, in particular its sub-branches with ground, is particularly advantageous.

In practice, the switch can be a relay. This is an efficient and reliable type of switch. Furthermore, the switch can be an electronic switch, an electromechanical switch, a micro-mechanical switch or any other suitable type of switch. In particular, in an arrangement comprising more than one switch, the switches involved can be of a different type.

Whereas the novel circuit and the effect obtained thereby are applicable to any suitable circuit including any suitable switches, the system can be highly automated by switches which are remotely controllable. In particular, a control system can be provided which controls any switches present. Thus, in a situation when the switches of the circuit described herein are provided in addition to further switches, numerous or all switches can be controlled by the same system. In particular, it can be ensured that a correct switching sequence is realized in order to achieve the desired connections. The invention further provides a novel system comprising at least one circuit in any of the above-described embodiments and a test and/or measurement device. As regards details of such a device, reference is again made to the WO 03/079599, the contents of which are incorporated herein by reference. In particular, suitable electrical connections are provided between the one or more circuits and the test and/or measurement device, as will be apparent to those skilled in the art. Thus, a test and/or measurement system is provided so as to be applicable to a telecommunication system. However, the circuit, as described herein which can, for example, be realized on a printed circuit board, can also be provided in a manner to be retro-fittable to an existing test and/or measurement system.

The invention further provides an improvement to test and/or monitoring access to a telecommunication line. The method can involve a circuit as described above and comprises the step of connecting only that primary branch, for which access to a telecommunication line is to be established, with a bus. All remaining primary branches can remain in their initial or "normal" state, in which some or all of them are disconnected from the bus and can, in particular, be connected with ground.

The described method essentially realizes the same effects, as described above, for the circuit.

Suitable modifications of the described method essentially correspond to those of the circuit described above. In particular, the switches can be remotely controlled in the described method so as to provide a highly automated system.

The invention, finally, provides a method of retrofitting an existing test and/or monitoring system in which an existing circuit for providing test and/or monitoring access is disconnected, and a circuit as described herein is connected to lines, modules and/or test and/or measurement devices as described above. In addition, at least one test and/or measurement device can be retrofitted to an existing system. An existing test and/or monitoring system can be in use and can be retrofitted with the novel circuit. However, also systems which may be in a state of being designed, or may be produced but not in use yet, can be retrofitted with the novel circuit.

BRIEF DESCRIPTION OF THE DRAWINGS

Hereinafter, the invention will be described by means of non-limiting examples thereof with reference to the drawings, in which.

DESCRIPTION OF A PREFERRED EMBODIMENT

Figure 1:
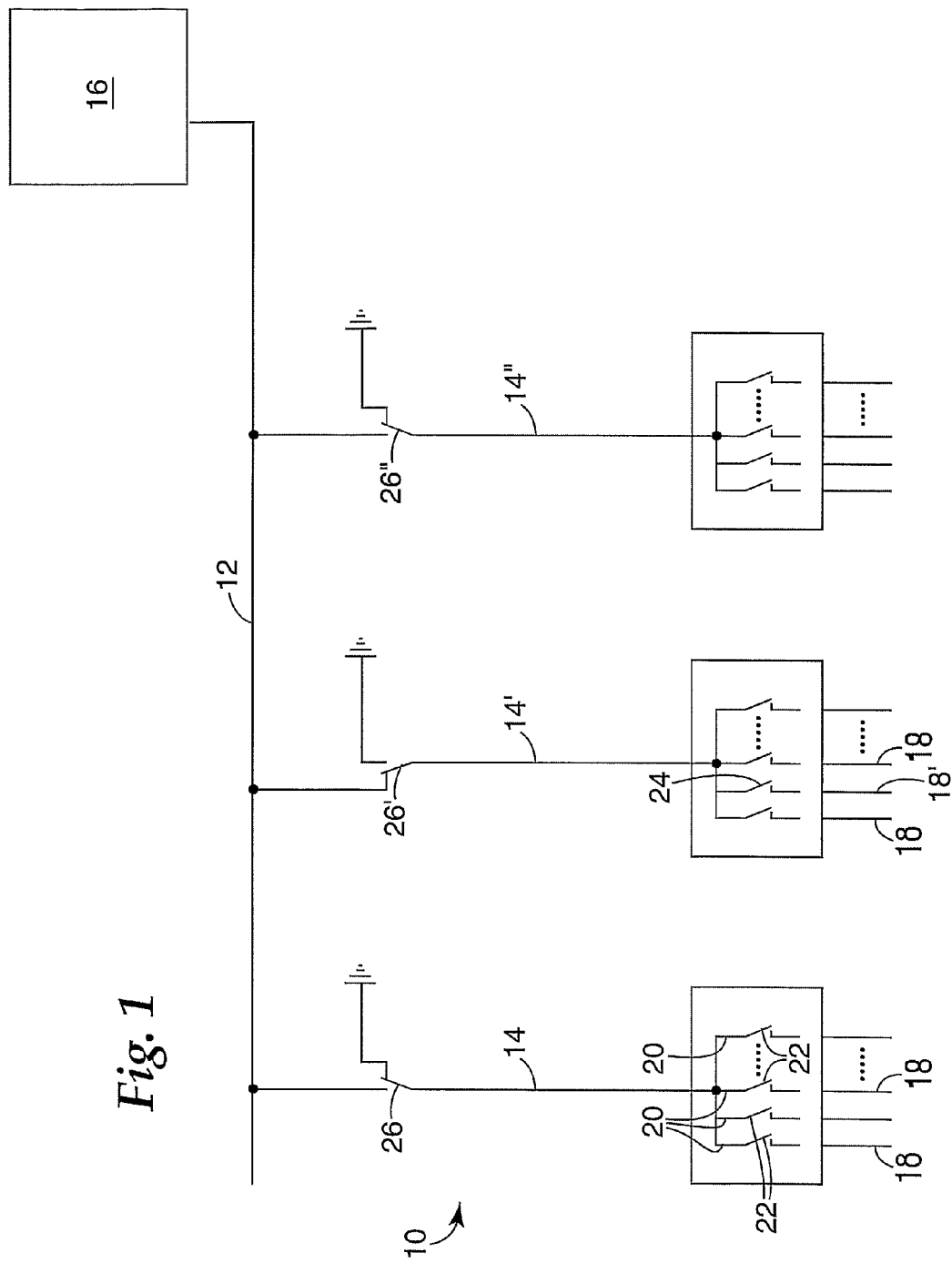
FIG. 1 shows a first embodiment of a circuit.

In FIG. 1, a circuit 10 generally consists of a bus 12 and several (in the case shown three) primary branches 14, 14', 14". The bus 12 is connected with a measuring device 16, which is provided to allow test of those telecommunication lines (described below), which are to be tested and/or monitored. Reference number 18 denotes the telecommunication lines. As is apparent from FIG. 1, several telecommunication lines 18 are grouped together, with three groups being shown in FIG. 1. This schematically indicates that several telecommunication lines are, as will be apparent to those skilled in the art, connected with contacts of a particular terminal module. Thus, as indicated in the drawing, one primary branch 14 can be connected with secondary branches 20 as described below, which are in turn connected with the telecommunication lines of a particular module. Thus, it can be said that each primary branch 14, 14', 14" is associated with a particular terminal module. However, this merely represents an example of a structure and any other structure of the mentioned lines is possible that allows the application of the circuit described herein.

In the embodiment shown in the drawing, several secondary branches 20 are connected with the (primary) branch 14. In the case shown, each of the secondary branches 20 comprises a switch 22 to connect and disconnect the secondary branches from the primary branch 14. In particular, the secondary branches 20 can remain disconnected from the primary branch 14 in an initial state. Whenever measurements are to be made via a particular secondary branch, the switch can be changed to a state in which the secondary branch 20 and the primary branch 14 are connected. This is shown for the center secondary branch 24 of the center group of telecommunication lines 18.

As apparent from approximately the center of FIG. 1, the center primary branch 14', which is connected with secondary branch 24, is connected with the bus 12 via primary switch 26'. In other words, this center primary branch 14' and the center secondary branch 24 are in use at a certain point in time and measurements can be made utilizing these lines. The signal, which is taken from that telecommunication line 18', with which the secondary branch 24 is connected, is eventually routed to the measuring device 16 via the secondary branch 24, the primary branch 14' and the bus 12.

As can be seen for the remaining primary branches, in the example shown 14 and 14", these are connected with ground when they are not in use. This can generally be described as their initial or "normal" state. Generally, any primary branches, secondary branches and further branches which might be present, remain disconnected from the bus 12 to reduce the parasitic capacitances as far as possible. In particular, the measuring device 16 is more or less directly connected with the telecommunication line 18' to be measured without any primary branches, which are not in use, being connected therewith. Thus, those primary branches which are not in use are, as a first step, disconnected from the bus 12. Furthermore, in a second step they can be connected with ground via switch 26, 26". This drains any current which may, for example, be induced in primary branches 14 and 14", to ground.

As is immediately evident to those skilled in the art, more or less primary branches 14 than the three primary branches shown can be connectable with the bus 12.

Figure 2:
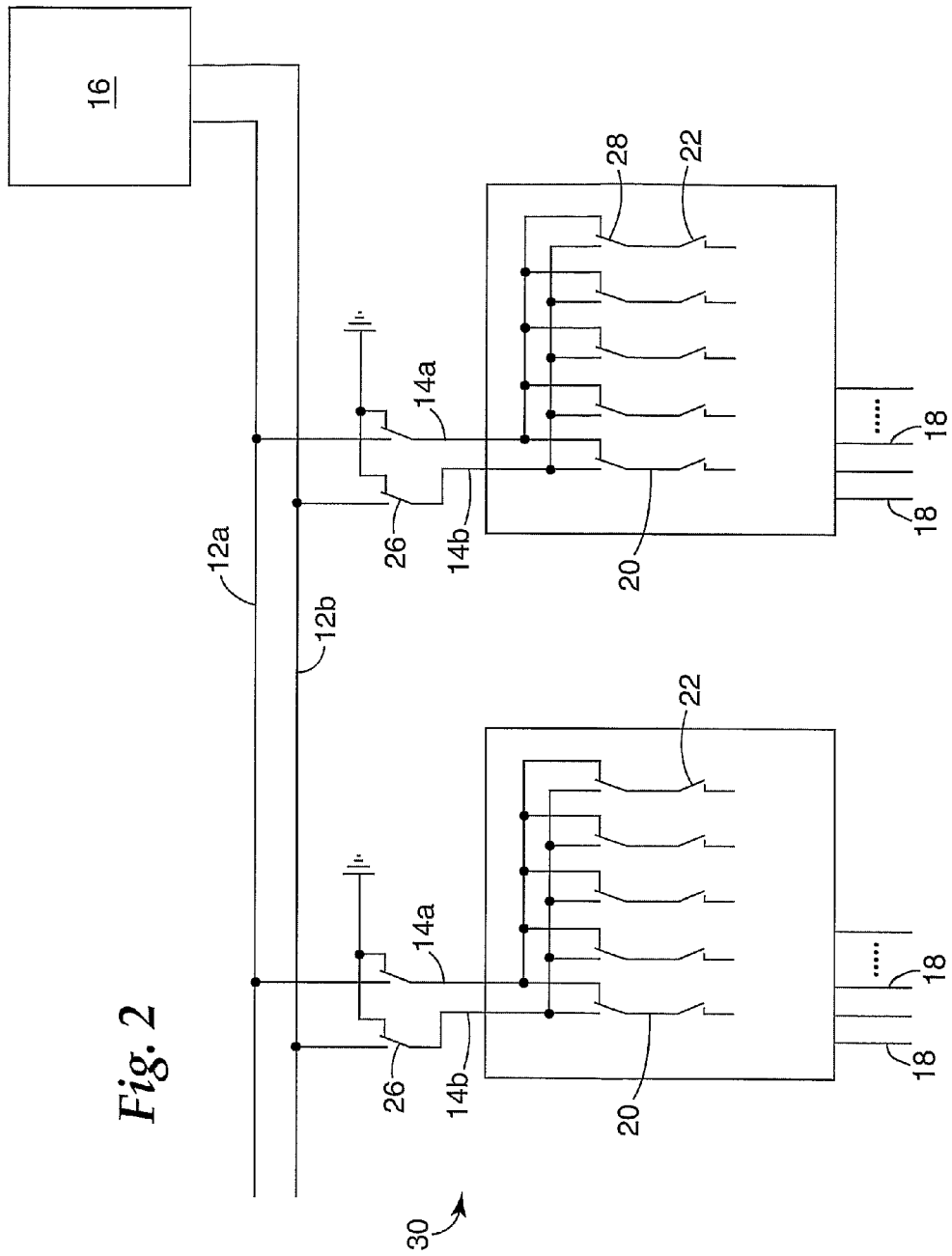
FIG. 2 shows a second embodiment of a circuit.

FIG. 2 shows a second embodiment of a circuit 30 in accordance with the invention. In this embodiment two buses 12a and 12b are provided. Accordingly, the primary branches 14 are constituted by sub-branches 14a and 14b. In essence, the circuit as shown in FIG. 1 is "doubled" in order to allow the connection of two separate buses 12a and 12b with particular telecommunication lines. In particular, two adjacent lines can be measured, for example, to determine crosstalk properties. Thus, the switch 26, which is provided for each of these sub-branches 14a and 14b, has the same effects as described above. In addition, each of the secondary branches 20, which is connectable with the telecommunication line via switch 22, can be connected with either bus 12a or bus 12b secondary switch 28. This secondary switch 28 particularly contributes to the parasitic capacitance, crosstalk or coupling between buses 12a and 12b and has the potential to deteriorate the results of measurements that are made via primary branches 14a and 14b as well as, if applicable, secondary branches 20. Thus, the possibility of connecting the disconnected branches including switches such as switch 28 with ground, which is realized by switch 26, advantageously improves the accuracy of measurements.

Figure 3:
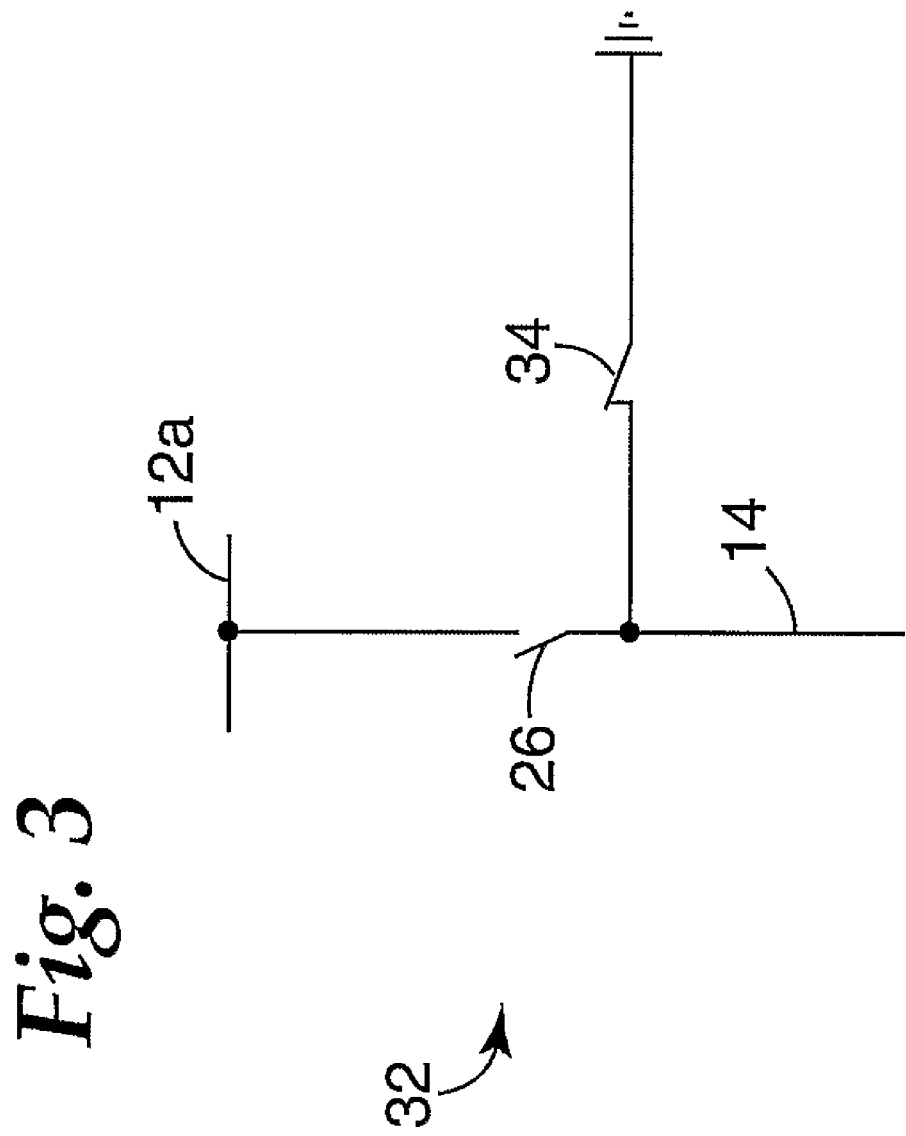
FIG. 3 shows an arrangement of two switches.

Finally, FIG. 3 shows an arrangement 32 of two switches 26 and 34, which, in this arrangement, essentially performs the same function as switch 26 of the circuit of FIG. 1. In the arrangement of FIG. 3, switch 26 connects the primary branch 14 with the bus 12. Whenever the primary branch 14 is disconnected from the bus 12, switch 34 can be brought into the state as shown in FIG. 3 in which the primary branch 14 is connected with ground. Thus, the arrangement 32 of FIG. 3 provides the same advantages as described above. It should be noted that switches 26 and 34 can be of the same or of a different type. In this context, any types of switches as mentioned above can be used.

The invention claimed is:
1. A circuit for providing test and/or monitoring access to at least two telecommunication lines comprising at least one bus and at least two primary branches, at least one of the primary branches being provided with at least one switch which in a first state connects the primary branch with the bus and in a second, normal state, when the primary branch is not in use, connects the primary branch with ground for draining any unintended signal on the primary branch to prevent the unintended signals from coupling to the bus, wherein at least one primary branch comprises at least two secondary branches, at least one of the secondary branches being provided with a second switch which, in a first state, connects the secondary branch with the primary branch.

2. A circuit according to claim 1 comprising at least two buses, at least one of the primary branches being constituted by at least two sub-branches, each of the sub-branches being connected with one bus, and least one switch being provided for connecting a telecommunication line with a selected one of the buses.

3. A circuit according to claim 1 wherein at least one switch is a relay.

4. A circuit according to claim 1 wherein at least one switch is remotely controllable.

5. A system comprising at least one circuit according to claim 1 and at least one test or measurement device.

6. A method of providing test or monitoring access to a telecommunication line, including a circuit comprising at least one bus and at least two primary branches each coupling to a telecommunication line each of the primary branches being, in an initial state, connected with ground, the method comprising the step of connecting only that primary branch through which access to a telecommunication line is to be established with the bus while the others of the at least two primary branches remain connected to ground for draining any unintended signal on the primary branch to prevent the unintended signals from coupling to the bus.

7. The method according to claim 6 wherein at least one primary branch comprises at least two secondary branches, the secondary branches being, in an initial state, disconnected from the primary branch, the method comprising the step of connecting only that secondary branch through which access to a telecommunication line is to be established with the primary branch.

8. The method according to claim 6 wherein at least one switch is remotely controlled.

9. The method according to claim 6 wherein the test serves to locate an open line.

10. The method according to claim 6 wherein the test serves to measure at least one physical parameter selected from the group consisting of voltage, frequency-dependent voltage and interfering voltage.

11. method according to claim 6 wherein the test serves to measure a response of the line to specific emitted signals.

12. A method of retro-fitting an existing test or monitoring system, comprising the steps of:
   a) disconnecting at least one existing circuit for providing test or monitoring access, and
   b) connecting at least one circuit for providing test or monitoring access, the circuit comprising at least one bus and at least two primary branches, at least one of the primary branches being provided with at least one switch which in a first state connects the primary branch with the bus and in a second, normal state, when the primary branch is not in use, connects the primary branch with ground for draining any unintended signal on the primary branch to prevent the unintended signals from coupling to the bus, wherein at least one primary branch comprises at least two secondary branches, at least one of the secondary branches being provided with a second switch which, in a first state, connects the secondary branch with the primary branch.

13. The method according to claim 12 further comprising the step of retro-fitting the existing test or monitoring system with at least one test or measurement device.

* * * * *